United States Patent
Leiba et al.

(12)

(10) Patent No.: US 6,260,065 B1
(45) Date of Patent: Jul. 10, 2001

(54) TEST ENGINE AND METHOD FOR VERIFYING CONFORMANCE FOR SERVER APPLICATIONS

(75) Inventors: Barry Leiba, Cortland Manor; Anthony Romano, Hughsonville; Jürg Von Känel, Mahopac, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/229,852

(22) Filed: Jan. 13, 1999

(51) Int. Cl.[7] .................................................. G06F 13/00

(52) U.S. Cl. ............................ 709/224; 709/223; 714/39

(58) Field of Search ................................ 709/223, 224, 709/230, 237, 220, 221, 313; 714/25, 37, 39, 47

(56) References Cited

U.S. PATENT DOCUMENTS

| 5,535,326 | * | 7/1996 | Baskey et al. ........................ 714/4 |
| 5,659,555 | * | 8/1997 | Lee et al. ............................ 714/738 |
| 5,790,425 |   | 8/1998 | Wagle . |
| 5,812,436 | * | 9/1998 | Desgrousilliers et al. ........... 702/108 |
| 6,052,694 | * | 4/2000 | Bromberg .......................... 707/200 |

* cited by examiner

Primary Examiner—Viet D. Vu
(74) Attorney, Agent, or Firm—F. Chau & Associates, LLP

(57) ABSTRACT

A method to verify standards conformance for a server application, in accordance with the present invention includes the steps of providing configuration information and a sequence of test commands to the server application with response requirements for expected responses associated with each of the commands, issuing at least one of the commands from the sequence to the server application, receiving at least one response from the server application and comparing the at least one response with expected responses for performing compliance testing based on the response requirements. Systems for conformance testing are also included.

36 Claims, 9 Drawing Sheets

TEST ENGINE AND METHOD FOR VERIFYING CONFORMANCE FOR SERVER APPLICATIONS

BACKGROUND OF THE INVENTION

1. Field of the Invention

The present invention relates to servers, for example personal computer servers, and more particularly to a system and method for verifying protocol conformance of servers, for example, to Client/Server protocol compliance.

2. Description of the Related Art

The rapid increase in popularity of the World Wide Web (WWW or web) has created a need for a set of standards, commonly defined in Request For Comments (RFC) documents. These documents describe communication protocols for web-based applications, such as electronic mail, file transfer, mail transfer, network management and many others things.

Web-based applications operate in a Client and Server model, where the client will communicate with the server based on the defined standards, for example, the IMAP4 (Internet Massaging Access Protocol). E-mail Client and Server communicate according to the protocol defined in RFC2060, and the SMTP (Simple Mail Transfer Protocol) Client and Server communicate according to the protocol defined in RFC821.

Specifications in an RFC document define rules of the base protocol, and provide for certain requirements and freedom from the rules. The requirements state rules that must be followed, whereas a less restricted rule should be followed but there may exist valid reasons in particular circumstances to ignore a particular aspect of such a rule, or perhaps the entire rule may be optional. Consequently, each implementation of protocol can differ from each other, resulting in interoperability issues between implementations.

Once a protocol is widely used by the Internet community, the need for improvements and enhancements results in extensions to the base protocol, and therefore the existing implementations of the protocol may choose to integrate some or all of the extensions while retaining interoperability requirements.

The conventional approaches to ensuring conformance and interoperability of an implementation include:

1. Testing with real clients requires that a user interact manually with the clients, and requires that the testers obtain a wide variety of clients to test with. This restricts what can be tested to those functions that are used by those specific clients, or
2. Telnet, which allows specific protocol sequences to be tested, but which requires manual work (typing commands and checking the responses by hand), or
3. A developer may have a custom, protocol-specific program that performs some level of automated testing.

Once the conformance and the interoperability issues are resolved, the server implementation faces an entirely different set of issues, such as durability and scalability. The conventional approach disadvantageously includes a test lab that employs many resources (humans, machines and software) to accomplish durability and scalability tests.

Therefore, a need exists for a generic test engine to automate the process of conformance, interoperability, durability and scalability of servers. A further need exists for a system and method for protocol-specific tests and expected test results which are described and executed with no need for human intervention nor customized software.

SUMMARY OF THE INVENTION

A method to verify standards conformance for a server application, in accordance with the present invention includes the steps of providing configuration information and a sequence of test commands to the server application with response requirements for expected responses associated with each of the commands, issuing at least one of the commands from the sequence to the server application, receiving at least one response from the server application and comparing the at least one response with expected responses for performing compliance testing based on the response requirements.

A program storage device readable by machine, tangibly embodying a program of instructions executable by the machine to perform method steps for verifying standards conformance for a server application, the method steps include providing configuration information and a sequence of test commands from the server application with response requirements for expected responses associated with each of the commands, issuing at least one of the commands from the sequence to the server application, receiving at least one response from the server application and comparing the at least one response with expected responses for performing compliance testing based on the response requirements.

In other methods which may be executed by a program storage device, the at least one response may include a plurality of responses, each response including at least one component and the method may further include the steps of permitting non-deterministic ordering of the responses and permitting ordering of components within each response. The method may further include the step of performing a stress test with stopping criteria to test durability of the server application. The method may further include the step of specifying responses associated with the at least one command to be saved and used for subsequent commands and comparisons to the expected responses. The method may further include the step of grouping commands such that a failure of compliance of any command in the group results in exiting the group and continuing in subsequent commands outside the group. The grouping may be hierarchical. The method may further include the step of generating a test sequence from a state machine. The test sequence may be based on probabilistic transitions. The expected responses may be marked as one of a mandatory response, an optional response, a forbidden response, several mandatory responses and several optional responses for permitting testing of various types of responses, various types of test data and varied implementations of the server application. The expected responses may include pattern symbols. The method may further include the step of performing a scalability test.

A test engine for verifying standard conformance for server applications includes a test processor and a protocol component for communicating with a server having the server application. The test processor further includes parser means for parsing and checking test instructions input to the test processor, the parser means for converting parsed test instructions into objects and an execution engine for executing the objects output from the parser means and analyzing the results of the execution of the instructions such that responses of the server application upon execution of the instructions are compared to expected responses included in the test instructions to determine conformance.

In alternate embodiment of the system, the execution engine may include a response analyzer for non-deterministic ordering of responses and ordering of components within the responses. The response analyzer preferably provides a mechanism for testing in a multi-way coordination among client sessions. The response analyzer may include a test generator component for generating multiple request sessions to the server application according to an input specification. The test generator may provide a stress test with stopping criteria for testing durability of the server application. The test generator may include a test sequence derived from a state machine. The test sequence may be derived from the state machine based on probabilistic transitions. The response analyzer may includes mean for specifying if a response from a command is saved and used in subsequent commands. The response analyzer may include a grouping mechanism for grouping commands wherein a failure of any command in the group results in exiting the group and continuing in subsequent commands outside the group. The grouping mechanism is preferably hierarchical. The expected responses are preferably marked as one of a mandatory response, an optional response, a forbidden response, several mandatory responses and several optional responses for permitting testing of various types of responses, various types of test data and varied implementations of the server application. The expected responses may be marked as pattern symbols.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to servers, for example personal computer servers, and more particularly to a system and method for verifying protocol conformance of servers, for example, to Client/Server protocol compliance. The present invention also includes a method to verify the compliance standards of a software application. The user provides configuration information, including, for example, identification of a protocol server to be tested, locations of test data, and destinations of test output. The present invention includes one or more of the following components.

A test processor component of a server conformance tester in accordance with the invention issues one or more commands from a command sequence to a protocol server, and receives one or more responses from the server. An analyzer component of the server conformance tester compares the received responses against expected responses and/or stores the responses for further processing. The analyzer component can be instructed to allow for permissible non-deterministic ordering of responses and ordering of components within any given response.

The server conformance tester provides a mechanism for testing multi-way coordination among client sessions, according to a test configuration. In this manner, clients coordinate their activities with the server in a synchronized fashion. The server conformance tester provides a mechanism for performing durability tests. The server conformance tester continuously performs protocol exchanges with the server for a specified or unlimited time period, and provides for criteria to stop the test process.

The analyzer component permits specifying the entire expected response to a command, or components of a response to be saved and used by subsequent commands as parameters, or to be further analyzed for more detailed verification. The server conformance tester supports a grouping mechanism that permits sequences of test commands to form a group block where a failure of any command in the group will result in exiting the group and continuing in subsequent commands outside the block. These group blocks may themselves be grouped hierarchically, to offer more flexibility to the test.

The server conformance tester permits the expected responses to be marked as "mandatory", "optional", or "forbidden", allowing for the testing of varying types of responses, with varying sets of test data, or against differing implementations in cases where the protocol allows implementation flexibility. The server conformance tester permits the expected responses to be made as "several mandatory" and "several optional", if the total number of server responses may vary by implementation or because of variations in test data.

Figure 1:
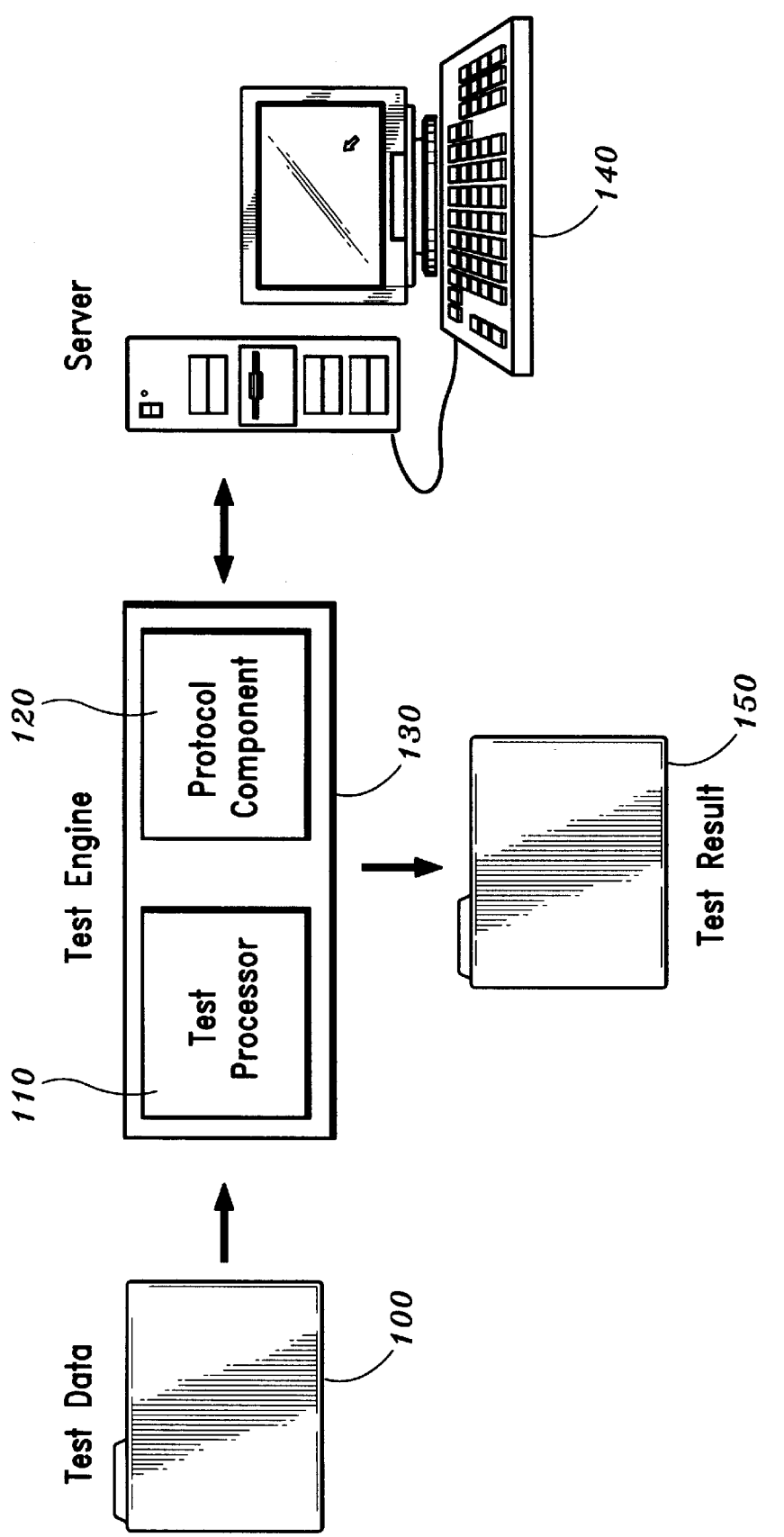
FIG. 1 is a flow/block diagram for a server conformance test environment in accordance with the present invention.

It should be understood that the elements shown in FIGS. 1–9 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIGS. 1 and 2, a test environment for a server conformance tester or conformance test engine 130 is shown. FIG. 1 depicts a high-level design of the conformance test environment, where client test data 100 is processed by the test engine 130, then transmitted to a server 140. The server 140 responses are then processed to create a test result 150.

The test data 100 preferably includes two separate parts:
1. A Test Configuration File, which includes information such as host name, logging level, timeout values, global variables for the test process, and the location of various components of the test (such as client test data, result files and other possible configuration files).
2. A Test Input File (TIF), which includes specific protocol commands and all the necessary control elements to manage the flow of the test process. The control elements may include local and global variables, grouping blocks, delays, serialization, iterations, and decision controls.

The test engine 130 of FIG. 1 includes two components that, together, are responsible for processing the test data 100, analyzing the server responses, and creating a meaningful detailed report. These include a test processor 110 and a protocol component 120.

The Test Processor 110 of FIG. 1 coordinates the test process and delegates tasks to various components. The following is a non-exhaustive list of tasks managed by the test processor 110:

1. Parsing and syntactical checking of the test data 100;
2. Conversion of the parsed data into executable objects;
3. Execution of the Test Data 100;
4. Error Processing; and
5. Output processing.

The protocol component 120, is responsible for adding protocol-specific information to the test data 100 and to manage transactions with a server 140. A separate implementation of this component may exist for each protocol that is to be tested.

The server 140 is the implementation of a protocol, for example, Post Office Protocol (i.e., POP3, RFC1939), and/or File Transfer Protocol (i.e., FTP, RFC 959).

Test Result 150 is a complete report of the test activity. The generated report includes information from pass/fail counts to detailed response analysis, timing information, and error messages, based on the logging level.

Figure 2:
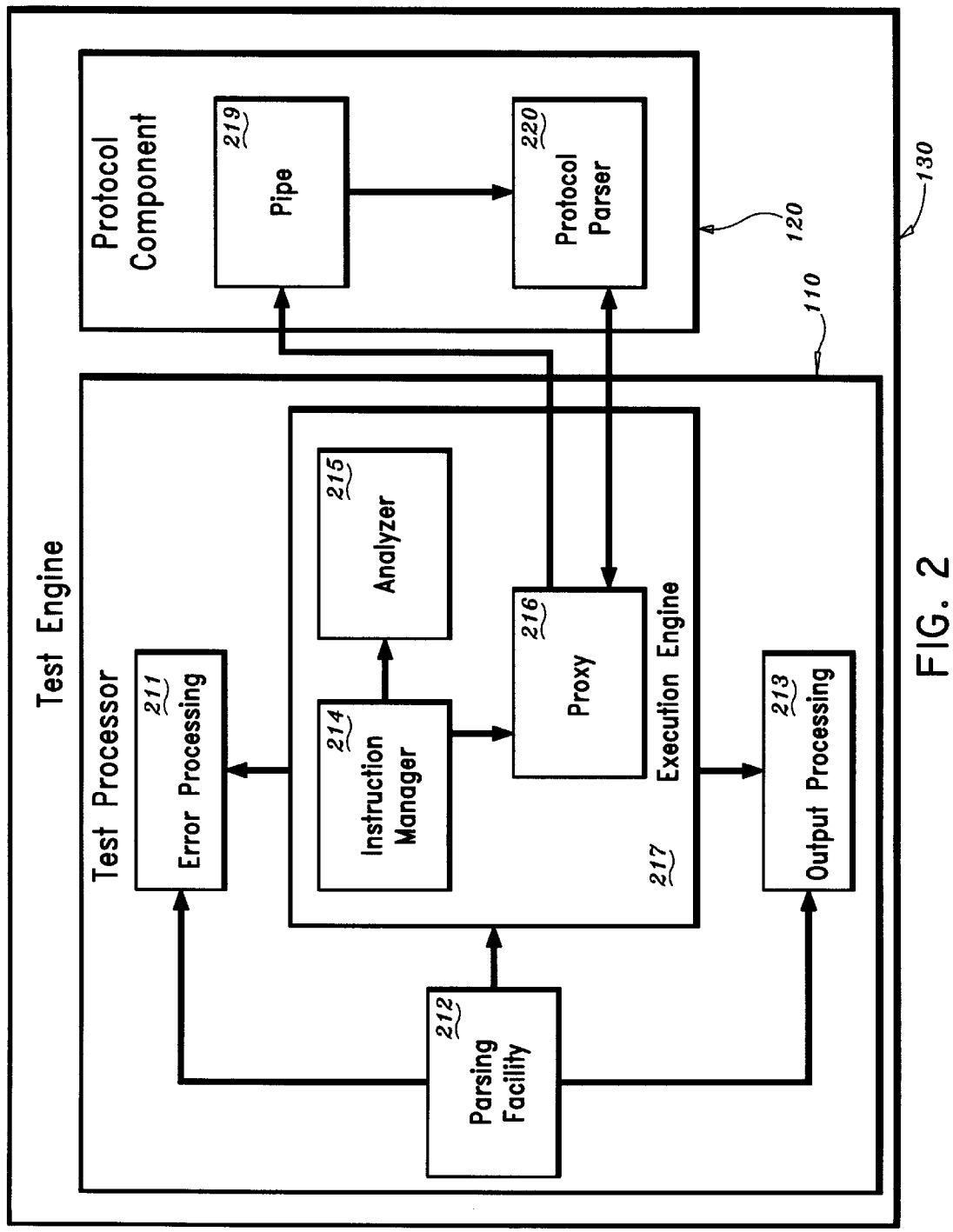
FIG. 2 is a flow/block diagram for a server conformance test engine in accordance with the present invention.

Referring to FIG. 2, the conformance test engine 130 is shown in greater detail, and interactions among the various components are shown. The test processor 110 includes a parsing facility 212, error processing 211, execution engine 217, and output processing 213 components.

The parsing facility 212 parses and performs a syntactical check on instructions of the Test Input File (TIF) pointed by the test data 100. The parsing facility 212 also converts these instructions to execution objects in canonical form, and delivers them to the execution engine 217. The parsing facility 212 interfaces with other components such as error processing 211 and output processing 213 to report syntax errors.

Error processing 211 provides meaningful text descriptions to the error codes generated by the parsing facility 212 and the execution engine 217. The execution engine 217 preferably includes three components that are responsible for executing the TIF execution objects and for analyzing the results. The execution engine 217 interfaces with error processing 211 and output processing 213 to produce reports on runtime errors.

The execution engine 217 preferably includes the following components. An instruction manager 214 controls the order and the special handling of the execution of objects produced by parsing facility 212. The instruction manager 214 transfers the server responses to an analyzer 215 for inspection. A proxy component 216 controls the data traffic to and from the server 140 (FIG. 1). The proxy component 216 caches the server responses for subsequent processing. The analyzer 215 is responsible for comparing the server responses received by the proxy 216 with the expected responses given in the TIF portion of the test data 100 (FIG. 1). The analyzer 215 generates raw information on the result of the analysis, which will be processed by output processing 213.

Output processing 213 is responsible for formatting data produced by the analyzer 215 and error processing 211 components. The resulting data may have information, among other things, in the following categories:

1. Syntactical errors.
2. Runtime execution errors.
3. Detailed analyzer error report.
4. Detailed analyzer report on each protocol transaction with the server 140.
5. Total pass/fail counts for the entire test.

A log level given in the test configuration of the test data 100 determines which categories of information will be reported in the test result 150 (FIG. 1) by the output processing 213.

The protocol component 120 is the protocol-specific portion of the test engine 130. The protocol component 120 has the knowledge needed to communicate with the server 140. The protocol component 120 includes a pipe 219 which is a communication component that establishes a connection between the conformance tester 130 and the server 140 (FIG. 1). The server 140 is identified by the host name given in the test configuration of test Data 100. A protocol parser 220 has the knowledge of reading and parsing the data from the pipe 219. Once the data have been processed by the protocol parser 220 component, the data will be cached by the proxy 216.

Figure 3:
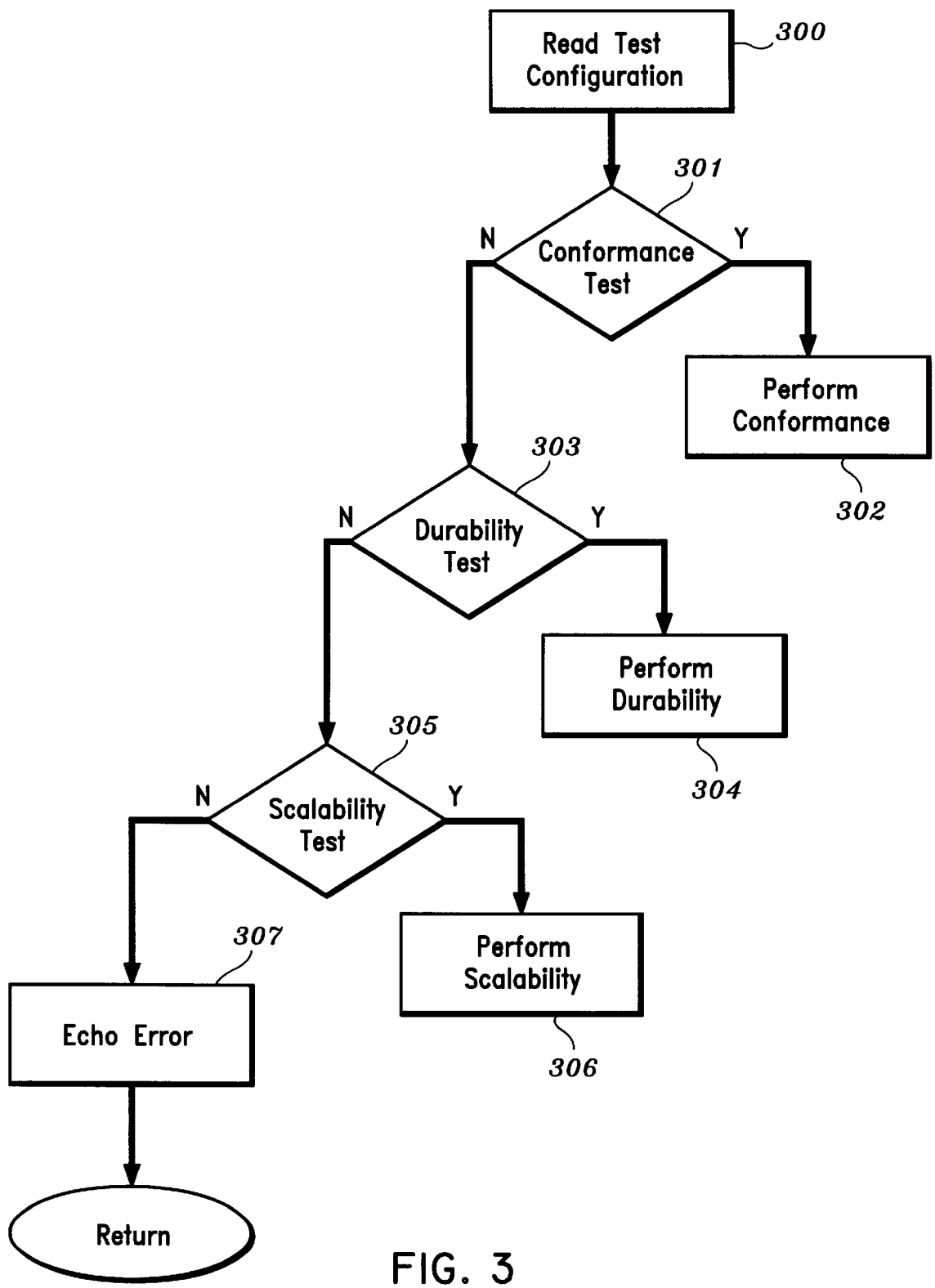
FIG. 3 is a flow diagram for initial test set up in accordance with the present invention.

Referring to FIG. 3, a high-level data flow for an initial test set-up is shown. The following method is performed by test engine 130. In step 300, the test configuration of the test data 100 is read and processed for the appropriate test types. The steps 301, 303, and 305 determine the test types for conformance, durability, and scalability testing respectively based on the test configuration read in step 300. The steps 302, 304, and 306 perform the initial setup and start the selected test. In step 307, any errors encountered are reported.

Figure 4:
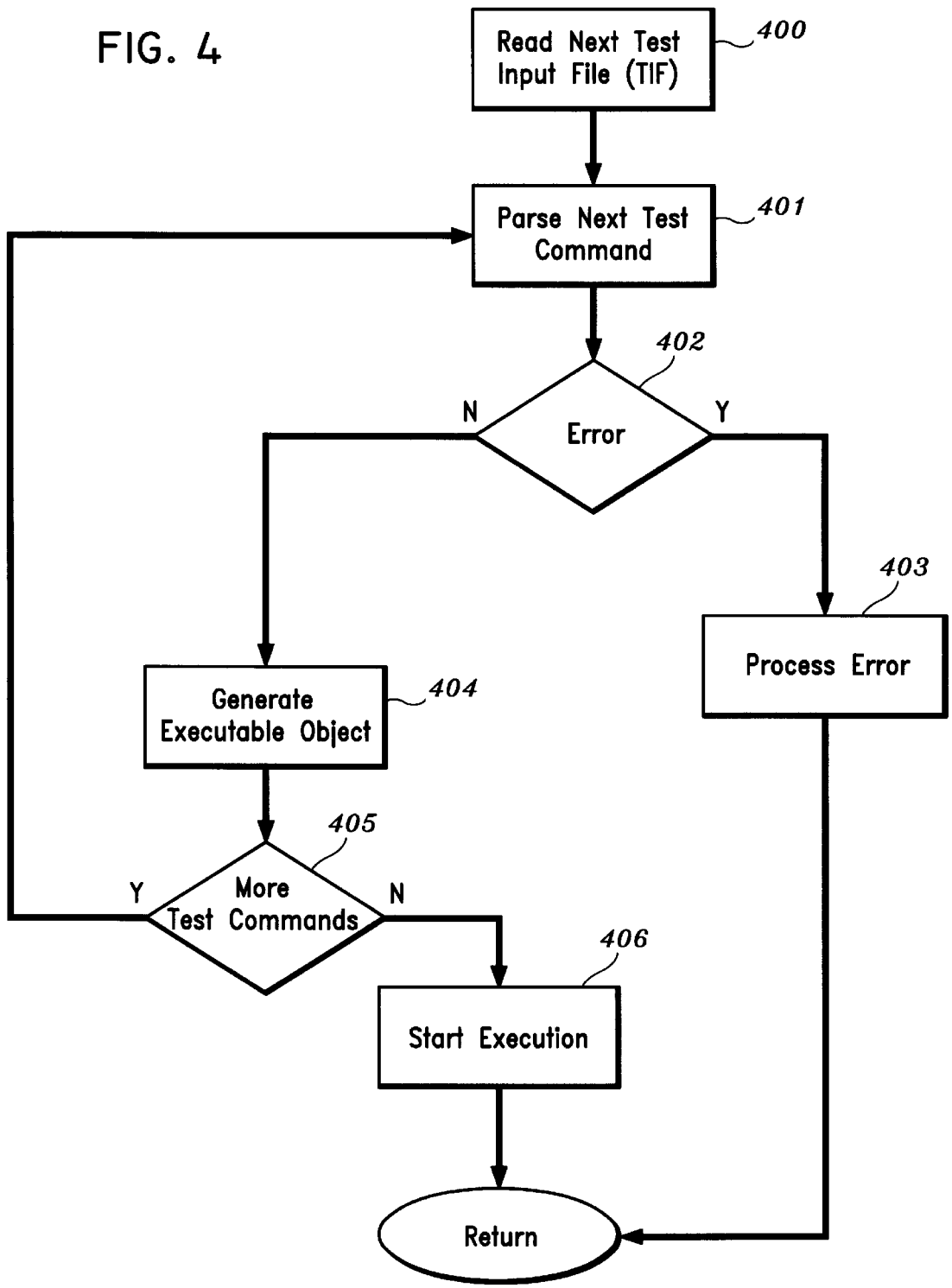
FIG. 4 is a high-level data flow diagram for conformance testing in accordance with the present invention.

Referring to FIG. 4, the high-level data flow of the conformance test performed in step 302 is shown in greater detail. The conformance test is a subset of other tests such as durability and scalability tests. These tests perform conformance in different manners to achieve their objective. For example, the durability test performs continuous conformance testing until a stopping criterion occurs or the test is interrupted by external means, such as human intervention.

In step 400, the Test Input File (TIF) of the test data 100 is read. A command parser 401 of parsing facility 212 parses each test command, performs syntactical checks, and creates an executable object for the command in step 404. The ownership of each executable object in step 404 is then transferred to the instruction manager 214. In case of an error in step 402, the step 403 invokes the error processing 211 to handle the error. Once TIF commands are processed without an error, then step 406 invokes the execution engine 217 to start the test.

Figure 5:
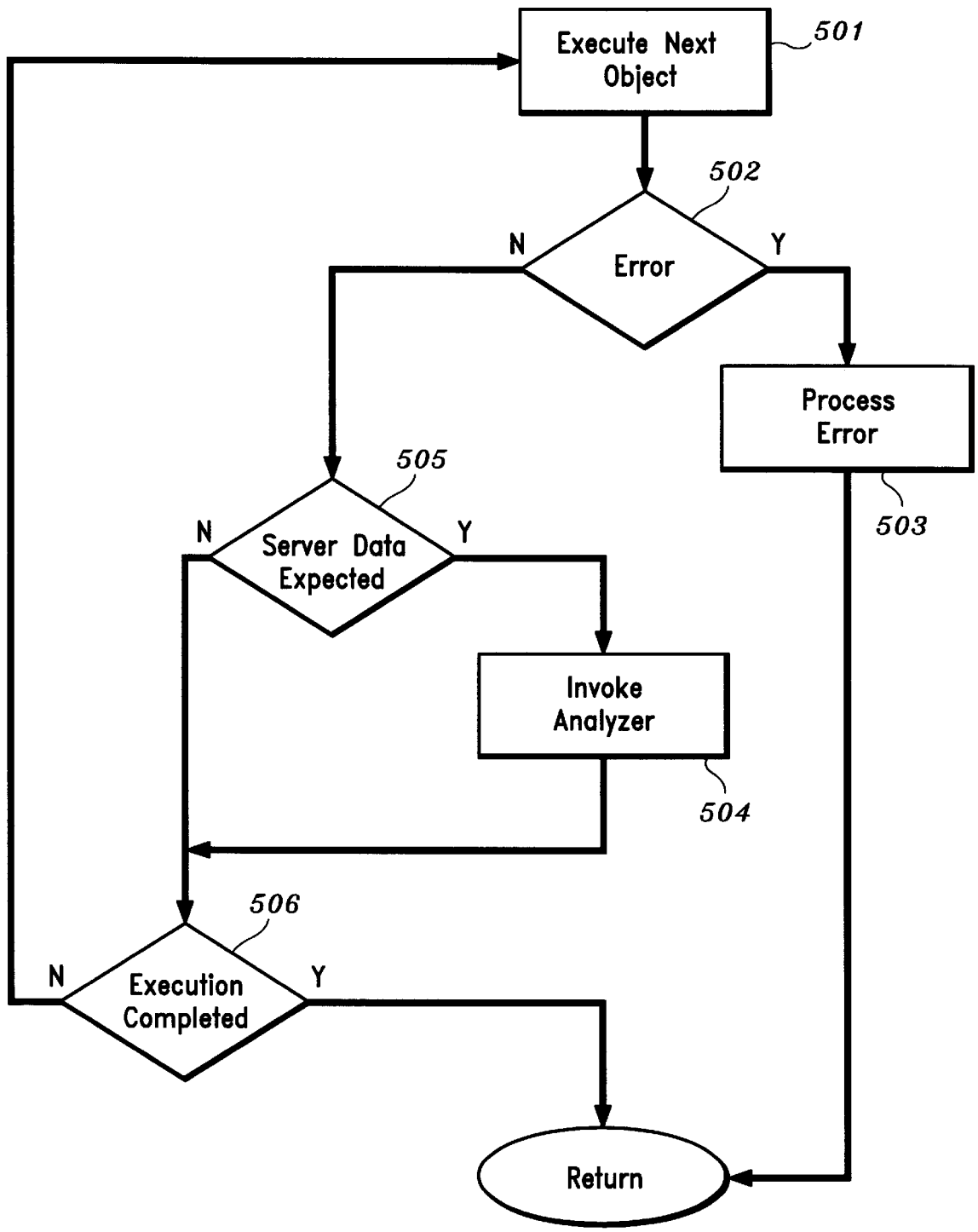
FIG. 5 is a flow diagram for object execution in accordance with the present invention.

Referring to FIG. 5, the high-level flow data flow of object execution is shown. In step 500, each execution object owned by the instruction manager 214 is processed. Step 505 determines whether the currently executed object expects any server response or was a flow control object such as time delay, loop control or branching instruction, where there is no server interaction (so no server responses are expected). If server responses are expected, step 504 invokes the analyzer 215 to compare the data with the expected responses. Run time errors are detected in step 502 and processed by step 503 using error processing 211.

Figure 6:
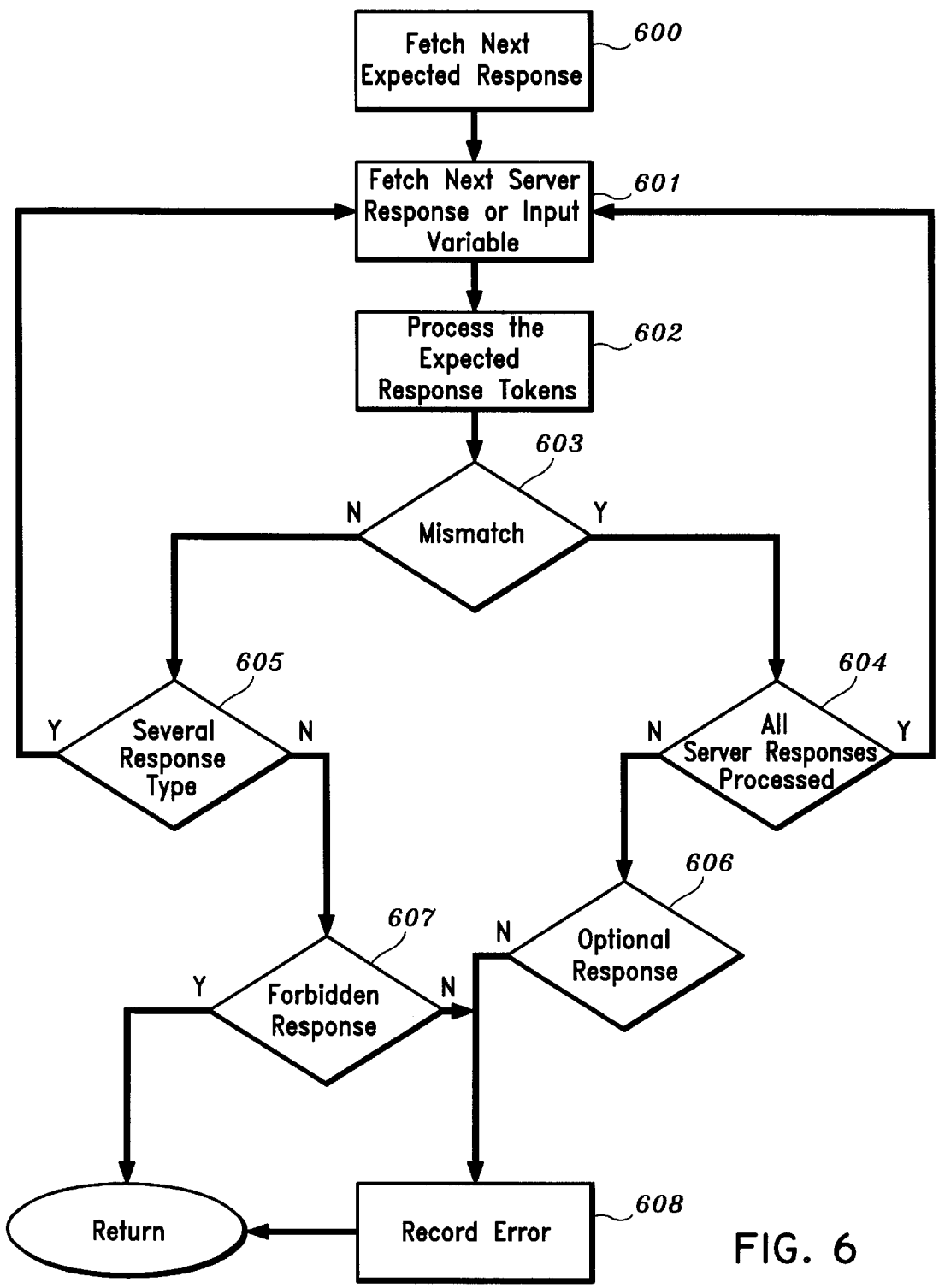
FIG. 6 is a high-level data flow diagram showing an analyzer process in accordance with the present invention.

Referring to FIG. 6, the high-level data flow of the process of analyzer 215 is shown. FIG. 6 illustrates the data flow for a single expected response. The expected responses may be marked as FORBIDDEN, OPTIONAL, MANDATORY, SEVERAL OPTIONAL, and SEVERAL MANDATORY, to define rules on the expected data. The FORBIDDEN attribute indicates that no responses matching this pattern are permitted in the server responses. The OPTIONAL attribute indicates that zero (0) or one (1) instance of the expected response may be found among the server responses. The MANDATORY attribute indicates that one (1) instance of the expected response must be found among the server responses. If SEVERAL is added to the OPTIONAL or MANDATORY attribute, it indicates that more than one instance of that response may be present among the server responses.

In steps 600 and 601, the analyzer 215 fetches an expected response, given in the TIF, and a server response, from a proxy 216 or a previously stored response from a variable, and compares the two tokens for equality in step 602. Steps 603, 604, 605 and 606 control the actions of the analyzer 215 for MATCH and MISMATCH results of step 602. When step 603 results in a MATCH, then step 605 tests the response type for the SEVERAL condition (SEVERAL MANDATORY or SEVERAL OPTIONAL), to determine whether more instances of the current response are expected. If so, then control is transferred to step 601. When step 603 results in a MISMATCH, then step 604 determines if all server responses have been compared with the current expected response, if not then next server response is processed; otherwise, control is transferred to step 606. Step 606 determines the type of the MISMATCHED expected response: for OPTIONAL and SEVERAL OPTIONAL response types no action is taken; otherwise, an error is recorded. Step 607 determines the type of the MATCHED expected response and an error is recorded in step 608 for the FORBIDDEN response type; otherwise, the test is successful The data arrangement in steps 601 through 607 allows for non-deterministic ordering of server responses to a given protocol command, and makes the test data usable with various implementations of a protocol, where such ordering may vary.

The following conditions may be recognized as errors by the analyzer:
1. The server response did not match the expected response;
2. The total number of server responses exceeded the total number of expected responses; and
3. The total number of tokens in a server response exceeded the total number in the expected response.

The present invention, advantageously expresses the expected server responses in a flexible and general format, and is capable of analyzing the actual server responses with the expected server responses.

An expected response in the test data may include text and symbols, where each symbol instructs the analyzer 215 to perform an action. Combinations of these symbols determine the validity of the server response against the expected response. The definition of a token in the expected response is purely protocol dependent, and the analyzer 215 consults with protocol parser 220 for such information.

There are preferably four types of symbols that may be in the expected response:
1. comparison patterns;
2. Extraction symbols;
3. Omission symbols; and
4. Target text processing symbols.

The comparison symbols are divided into two categories:
1. A case-insensitive comparison pattern includes a pattern enclosed by a pair of quotation marks. It tells the analyzer 215 that the next immediate token(s) in the server response must match the comparison pattern given.
2. A case-sensitive comparison pattern is similar to the case-insensitive comparison pattern, but it performs a case-sensitive comparison.

The two above symbols will perform a logical NOT operation when preceded by an exclamation ('!') character, for example. In this case, the analyzer 215 examines the next token in the server response with the search pattern for inequality and if the two patterns match, then an error will be returned.

The extraction symbols instruct the analyzer 215 to extract tokens from the server response and store the tokens into a variable. The variable may be used as a parameter for subsequent commands, or to be further analyzed in step 601. The extraction symbols are preferably broken down into 3 categories:
  1. The integer extraction symbol VAR=% d tells the analyzer 215 that the next token in the server response must be a numeric value. If it is, extract and store the value into a variable VAR.
  2. The text extraction symbol VAR=% sn tells the Analyzer to extract tokens within the server response and to store them into the variable VAR. The number of tokens extracted depends on the value of n. If n is absent from the symbol, then the number of token extracted depends on the position of the extraction symbol in the expected response. If the extraction symbol appears as the last symbol in the expected response, the remaining tokens in the server response will be extracted. If the extraction symbol appears elsewhere, then the tokens up to the point matched by the next symbol will be extracted and saved into the variable VAR.
  3. The pattern extraction symbol VAR="pattern" tells the analyzer to extract text from the server response and to compare it with the pattern (pattern), if they match, then store the text into the variable VAR.

The omission symbols instruct the analyzer to extract and ignore tokens from the server response. The omission symbols perform actions similar to those of the extraction symbols, except that the matched data are not stored.

The target text processing symbols are used to target the specific portion of a server response for further processing. It has the general format of [left boundary, action, right boundary] which contains the boundary of the targeted area of the server response and the action to be performed by the analyzer 215. In general, the boundaries must be protocol tokens. The analyzer 215 first locates the given matching boundaries within the server response and extracts its content, then performs the given action. The target text processing serves several purposes. The target text permits the test to break up a large response into smaller pieces, where each piece can be individually analyzed. Since the analyzer 215 operates in a linear fashion, where symbols are processed in a sequential order, the target text processing offers a non-linear analysis of the components of the server response. This aspect of the present invention makes the test data reusable by different implementations of a protocol, where the order of the protocol tokens in the server response may vary based on the implementation and still be allowable by the protocol.

The defined actions for target text processing are:
1. Token extraction;
2. Token omission; and
3. Non-linear token processing.

The token extraction operation preferably has the format of [left boundary, $VAR=VARNAME, right boundary] where the extracted target is stored into the variable VARNAME for analysis. For instance the expected response may include a symbol such as ['(', $var=ServInfo, ')'], which tells the analyzer 215 that the target data is enclosed in matching parentheses, and to extract the data and save it into the variable ServInfo.

The token omission operation may be similar to token extraction, except that the data between the boundaries are ignored. This operation becomes useful when the objective of the test is to verify the existence, but not the content, of the data within the server response.

The non-linear token processing preferably has the format of [left boundary, $SET=SETNAME, right boundary], where a set of target data will be used to search for the expected tokens in the server response. The symbols of the expected response are not processed sequentially, since the order of the tokens in the server response is unpredictable. Instead, the expected tokens are defined in a SET, where each element of the set is an expected token and the analyzer 215 looks for each element of the SET within the target data.

The following examples illustrate the operation of the analyzer 215.

EXAMPLE 1

Server response: 4000 OK Messages processed, STORE command completed

Expected: TagId=% d "OK" $% s Operation="store" $%s1 "completed"

The first token of the expected response is an integer extraction symbol, telling the analyzer 215 to put the value of the integer into the variable "TagID". The next token must be the case-insensitive string "OK". The analyzer 215 is then instructed to ignore an arbitrary number of string tokens and look for the (case-insensitive) string "store", which, if found, should be put into the variable names "Operation". Another single string token is ignored, and the string "completed" is expected as the last thing in the response.

The result of the analysis is that TagId becomes "4000", the string "OK" matches, the string "Messages processed," is ignored, the variable "Operation" becomes "STORE" (the upper-case string from the server response, not the lower-case string from the expected response), the string "command" is skipped, the string "completed" matches, and the expected and actual response end at the same spot and match. Note that if an error was found (that is, these responses did not match), neither of the variables would have been set, even if the response did match partway through.

EXAMPLE 2

This example illustrates the operation of a target text processing symbol where the action is to perform non-linear token processing.

| | |
|---|---|
| Server response: * 2 FETCH (FLAGS (\Answered\Deleted\Seen)) | |
| SET ("FlagData") | [Mandatory] "\Seen" |
| | [Mandatory] 37 \Deleted" |
| | [Optional] "\Answered" |
| | [Optional] "\Flagged" |
| | [Forbidden] "\Draft" |
| Expected: "*" $%d "FETCH (FLAGS" ["(", $SET="FlagData",")"] ")" | |

In this example, the string "*" is first expected, then an integer (which is otherwise ignored), then the string "FETCH (FLAGS", then a set of tokens enclosed in matching parentheses, and finally the string ")". The set of tokens must contain the tokens "\Seen" and "\Deleted", may contain the tokens "\Answered" or "\Flagged", and must not contain the token "\Draft". The tokens in the set may appear in any order. Again, the server response does match this response.

Sets may be nested, to allow for a great deal of flexibility in processing server response where the desired pieces are known, but where the order of the responses is unknown.

EXAMPLE 3

In this example, the server responses include attributes of folders, and it is desired to extract the attributes of one specific folder, the inbox.

| | | |
|---|---|---|
| Server response: | | * LIST (\Unmarked \HasNoChildren) "\\" |
| "outbox" | | |
| | | * LIST (\Marked \HasNoChildren) "\\" |
| "MyPersonalFolder" | | |
| | | * LiST (\Marked \HasNoChildren) "\\" |
| "inbox" | | |
| | | * LIST (\Unmarked \HasNoChildren) "\\" |
| "AnotherFolder" | | |
| Expected: | [M] | "* list" ["(", $VAR="InboxAttrib" ,")"] |
| $%s1 "inbox" | | |
| | [SO] | "* list" ["(", $%s , ")"] $%s1 !"inbox" |

The Analyzer expects one mandatory (M) response that matches "inbox", and the string between the parentheses is stored in the variable InboxAttrib. It also allows for several optional (SO) responses that do not match "inbox". Those responses are checked for valid syntax, but the data are not saved.

Figure 7:
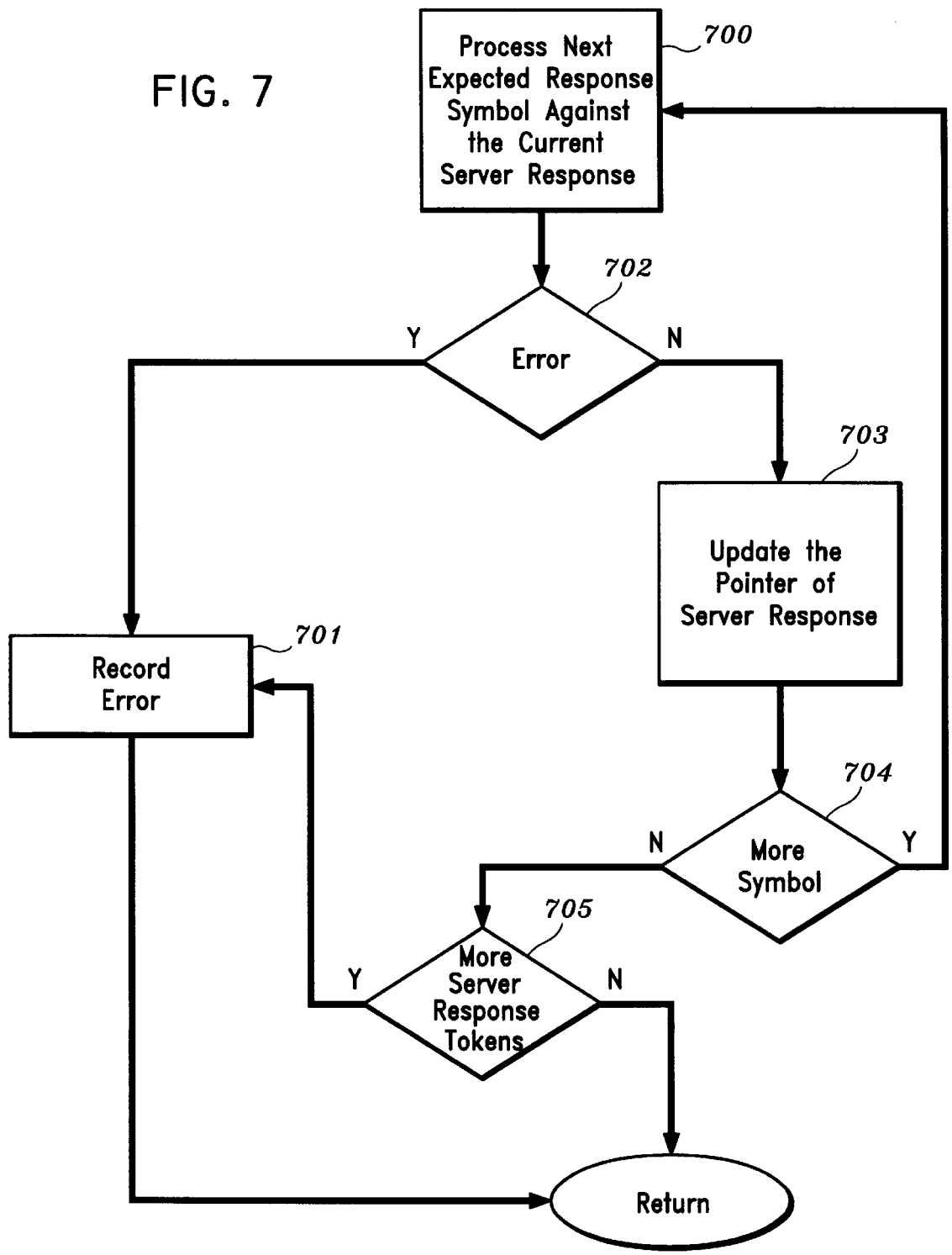
FIG. 7 is a flow diagram for an expected response symbol process in accordance with the present invention.

Referring to FIG. 7, a more detailed description of step 602, the comparison process for a single response, is shown. Step 700 compares a symbol from the expected response against the server responses. If there are no errors, then step 703 updates the pointer to the server response. Step 704 determines if all the symbols in the expected responses have been processed and, if so, step 705 determines if all the tokens in the server response have been processed. If not then an error is recorded by step 701.

Figure 8:
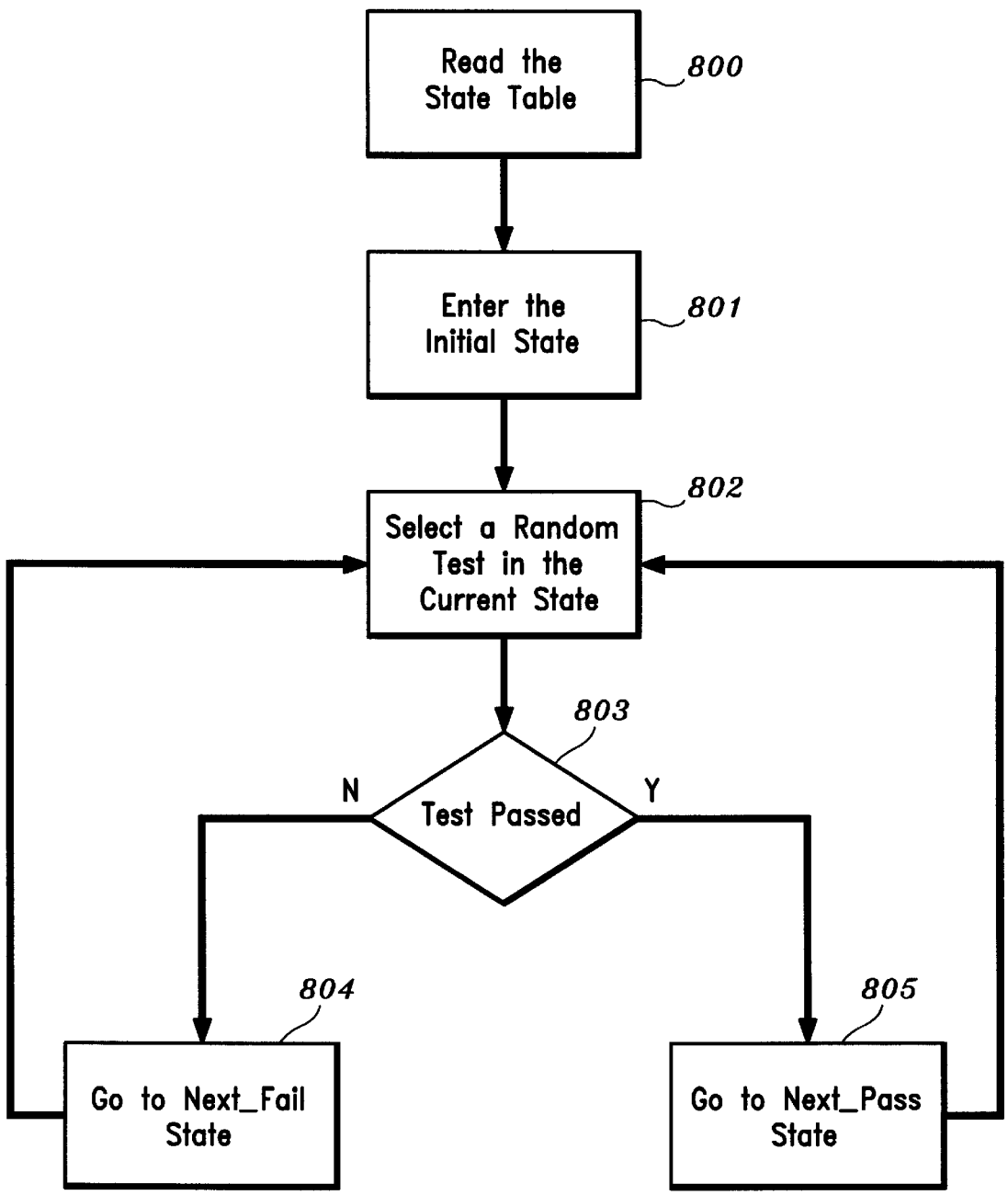
FIG. 8 is a high-level data flow diagram for durability testing in accordance with the present invention.

Referring to FIG. 8, the high-level data flow of the durability test of step 304 of FIG. 3 is shown. The durability test is used to determine whether a protocol server will remain functional under a continuous client load over a period of time. Normally, a server with a robust implementation, reliable hardware, and no resource leakage should sustain such a stress test. The durability test is driven by a test state machine, which is implemented as a superset of the protocol states. The state table that describes the test state machine offers one or more entries per state. Each entry in the table includes information such as a current state identification, a state to enter on success of this action, a state to enter on failure of this action, an action to take, and a weighting percentage. The action specifies either a test or a state command. The weighting percentage specifies how often this entry is chosen, compared with other entries for the same state. Supported state commands may include:

1. "Connect": connect to a server 140 and authenticate as specified in the test configuration of test data 100;
2. "NOOP": perform no operation and return successfully. This may be used to fine-tune the weighting percentages (for example, from state 6, go to state 7 80% of the time and perform "test-X" 20% of the time); and
3. "END": end the durability test.

In each state, the conformance tester 130 randomly chooses a state entry, based on the weighting percentage, takes the specified action (performs a test or accepts a state command), and determines its next state based on the result of the action.

Step 800 reads the state table data and performs the initial setup. Step 801 enters the initial state indicated by the state table. Step 802 randomly (according to the weighting percentage) selects an entry from that state and executes the specified action. Step 803 determines the result of the action from 802 and sets the system into the appropriate next state in steps 804 and 805, and control is transferred to 802 (unless the action was an "END" command, in which case the test is terminated.

Figure 9:
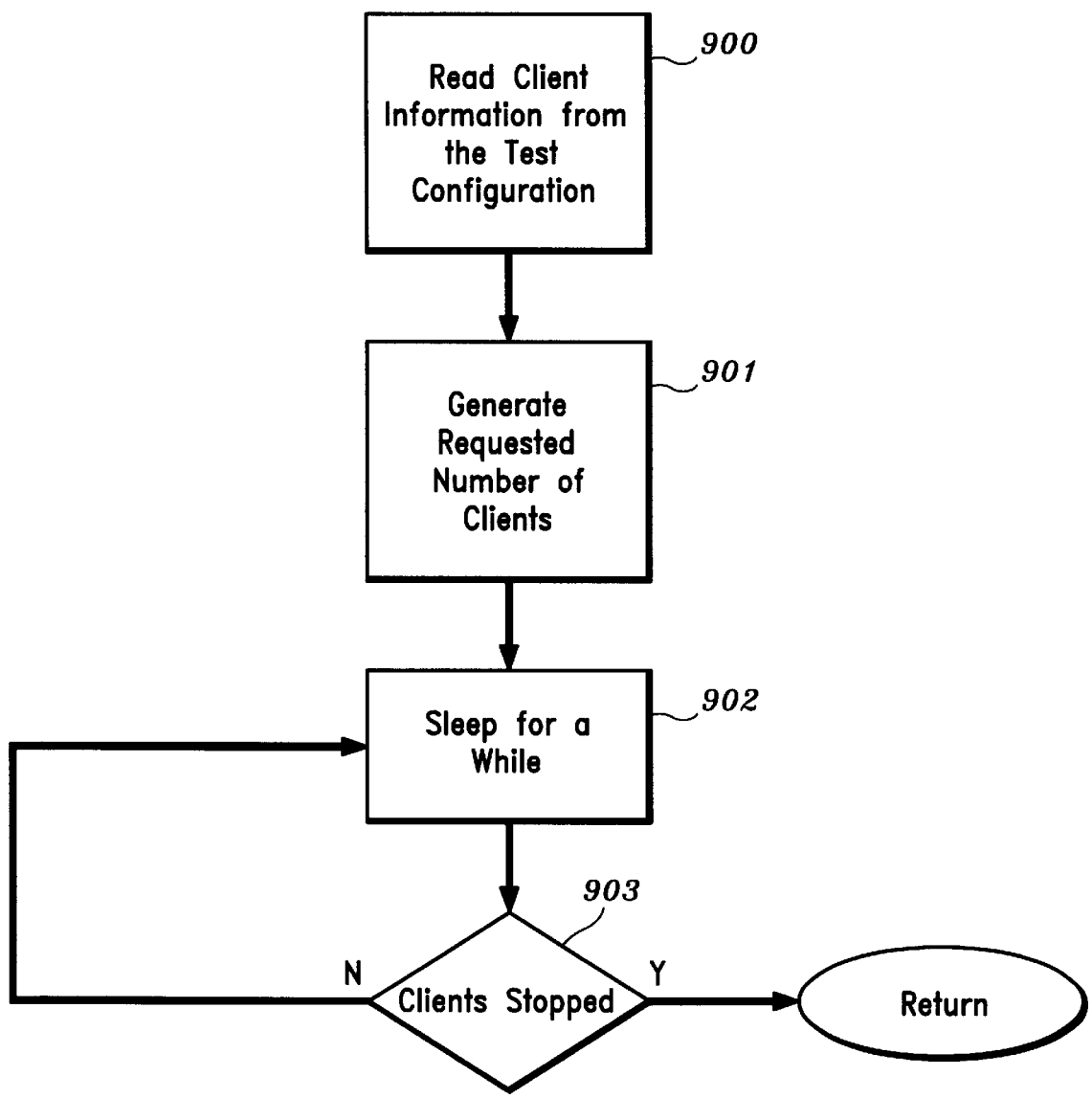
FIG. 9 is a high-level data flow diagram for a scalability process in accordance with the present invention.

Referring to FIG. 9, the high-level data flow of the scalability test of step 306 of FIG. 3 is shown, where numbers of clients perform durability or conformance tests against a protocol server. The number of clients and the necessary information for each client are given in the test configuration of test data 100. Each client runs in a single thread or process and establishes a session with the server 104 (FIG. 1). Step 900 reads the client information from test data 100. Step 901 starts all the clients, where each client may perform durability or conformance tests against the server 140 independently. In step 903, the conformance tester sleeps for some period of time, randomly selected to spread out the activity. In step 904, the tester wakes up and checks the status of each client. If all clients have terminated, then the test will end. Otherwise, control is transferred to step 903.

Having described preferred embodiments of a server conformance tester (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method to verify standards conformance for a server application, comprising the steps of:
   providing configuration information and a sequence of test commands to the server application with response requirements for expected responses associated with each of the commands;
   issuing at least one of the commands from the sequence to the server application;
   receiving at least one response from the server application;
   permitting non-deterministic ordering of responses when a plurality of responses are received; and
   comparing the at least one response with expected responses for performing compliance testing based on the response requirements.

2. The method as recited in claim 1, wherein the at least one response includes a plurality of responses, each response including at least one component and the method further comprising the step of:
   permitting ordering of components within each response.

3. The method as recited in claim 1, further comprising the step of performing a stress test with stopping criteria to test durability of the server application.

4. The method as recited in claim 1, further comprising the step of specifying responses associated with the at least one command to be saved and used for subsequent commands and comparisons to the expected responses.

5. The method as recited in claim 1, further comprising the step of grouping commands such that a failure of compliance of any command in the group results in exiting the group and continuing in subsequent commands outside the group.

6. The method as recited in claim 5, wherein the grouping is hierarchical.

7. The method as recited claim 1, further comprising the step of generating a test sequence from a state machine.

8. The method as recited in claim 7, wherein the test sequence is based on probabilistic transitions.

9. The method as recited in claim 1, wherein the expected responses are marked as one of a mandatory response, an optional response, a forbidden response, several mandatory responses and several optional responses for permitting testing of types of responses, types of test data and implementations of the server application.

10. The method as recited in claim 1, wherein the expected responses include pattern symbols.

11. The method as recited in claim 1, further comprising the step of performing a scalability test.

12. A program storage device readable by machine, tangibly embodying a program of instructions executable by the machine to perform method steps for verifying standards conformance for a server application, the method steps comprising:
   providing configuration information and a sequence of test commands from the server application with response requirements for expected responses associated with each of the commands;
   issuing at least one of the commands from the sequence to the server application;
   receiving at least one response from the server application;
   permitting non-detenninistic ordering of responses when a plurality of responses are received; and
   comparing the at least one response with expected responses for performing compliance testing based on the response requirements.

13. The program storage device as recited in claim 12, wherein the at least one response includes a plurality of responses, each response including at least one component and the method further comprising the step of:
   permitting ordering of components within each response.

14. The program storage device as recited in claim 12, further comprising the step of performing a stress test with stopping criteria to test durability of the server application.

15. The program storage device as recited in claim 12, further comprising the step of specifying responses associated with the at least one command to be saved and used for subsequent commands and comparisons to the expected responses.

16. The program storage device as recited in claim 12, further comprising the step of grouping commands such that a failure of compliance of any command in the group results in exiting the group and continuing in subsequent commands outside the group.

17. The program storage device as recited in claim 16, wherein the grouping is hierarchical.

18. The program storage device as recited claim 12, further comprising the step of generating a test sequence from a state machine.

19. The program storage device as recited in claim 18, wherein the test sequence is based on probabilistic transitions.

20. The program storage device as recited in claim 12, wherein the expected responses are marked as one of a mandatory response, an optional response, a forbidden response, several mandatory responses and several optional responses for permitting testing of types of responses, types of test data and implementations of the server application.

21. The program storage device as recited in claim 12, wherein the expected responses include pattern symbols.

22. The program storage device as recited in claim 12, further comprising the step of performing a scalability test.

23. A test engine for verifying standard conformance for server applications comprising:

a test processor and a protocol component for communicating with a server having the server application;

the test processor including:

a parser which parses and checks test instructions input to the test processor, the parser converting parsed test instructions into objects; and an execution engine which executes the objects output from the parser and analyzes the results of the execution of the instructions such that responses of the server application upon execution of the instructions are compared to expected responses included in the test instructions to determine conformance;

the execution engine including a response analyzer which analyzes the responses and provides for non-deterministically ordering of the responses.

24. The system as recited in claim 23, wherein the response analyzer provides ordering of components within the responses.

25. The system as recited in claim 23, wherein the response analyzer provides a mechanism for testing in a multi-way coordination among client sessions.

26. The system as recited in claim 23, wherein the response analyzer includes a test generator component for generating multiple request sessions to the server application according to an input specification.

27. The system as recited in claim 26, wherein the test generator provides a stress test with stopping criteria for testing durability of the server application.

28. The system as recited in claim 26, wherein the test generator includes a test sequence derived from a state machine.

29. The system as recited in claim 28, wherein the test sequence is derived from the state machine based on probabilistic transitions.

30. The system as recited in claim 23, wherein the response analyzer includes means for specifying if a response from a command is saved and used in subsequent commands.

31. The system as recited in claim 23, wherein the response analyzer includes a grouping mechanism for grouping commands wherein a failure of any command in the group results in exiting the group and continuing in subsequent commands outside the group.

32. The system as recited in claim 31, wherein the grouping mechanism is hierarchical.

33. The system of claim 23, wherein the expected responses are marked as one of a mandatory response, an optional response, a forbidden response, several mandatory responses and several optional responses for permitting testing of types of responses, types of test data and implementations of the server application.

34. The system of claim 23, wherein the expected responses are marked as pattern symbols.

35. A method to verify standards conformance for a server application, comprising the steps of:

providing configuration information and a sequence of test commands to the server application with response requirements for expected responses associated with each of the commands;

issuing at least one of the commands from the sequence to the server application;

receiving at least one response from the server application;

comparing the at least one response with expected responses for performing compliance testing based on the response requirements; and grouping commands such that a failure of compliance of any command in the group results in exiting the group and continuing in subsequent commands outside the group.

36. A program storage device readable by machine, tangibly embodying a program of instructions executable by the machine to perform the method steps as recited in claim 35.

* * * * *